April 5, 1955  P. W. SCHIPPER  2,705,427
FEED AND RAPID CONTROL FOR MACHINE TOOLS
Filed July 29, 1954  2 Sheets-Sheet 1
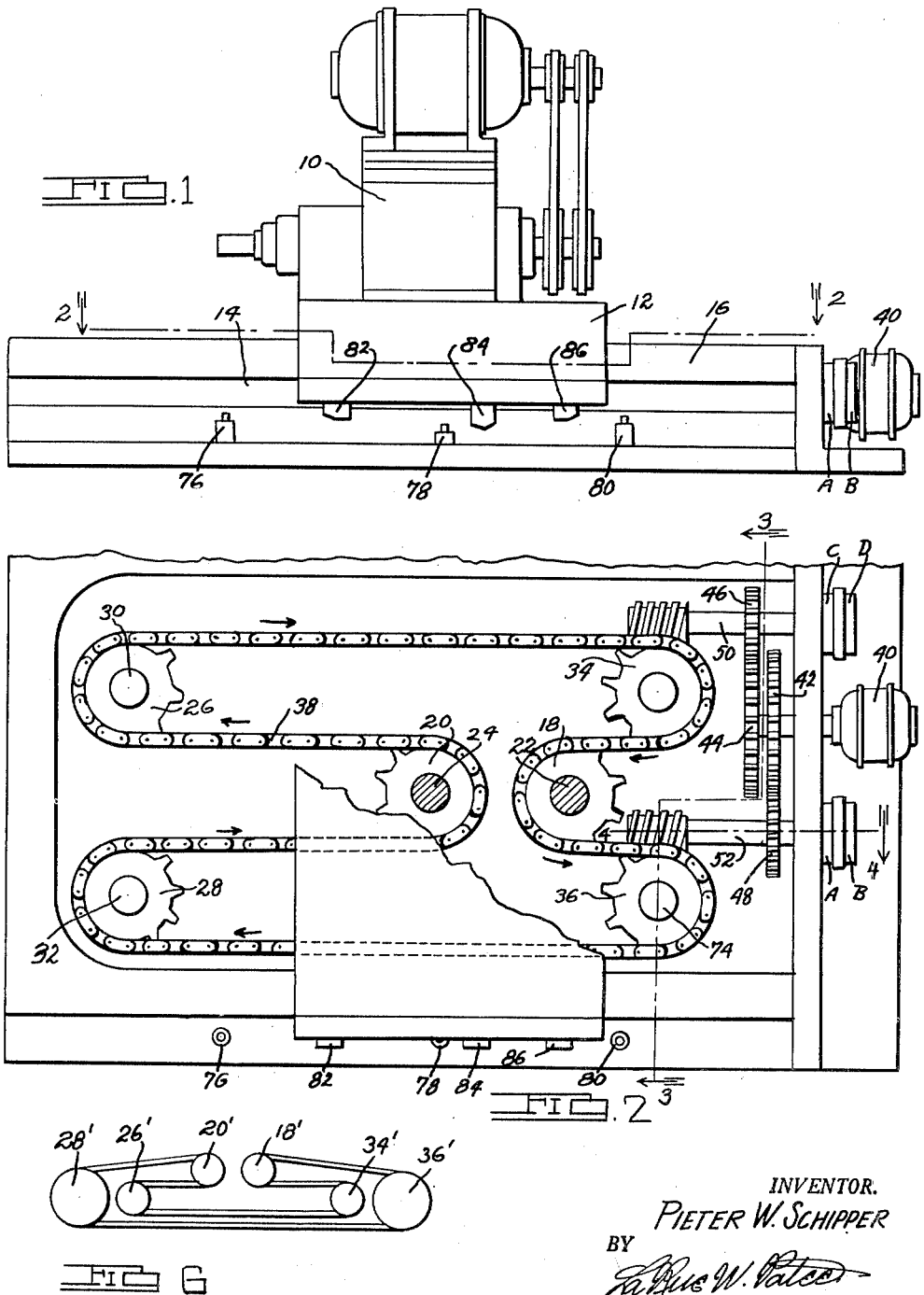
INVENTOR.
PIETER W. SCHIPPER
BY
HIS ATTORNEY April 5, 1955  P. W. SCHIPPER  2,705,427
FEED AND RAPID CONTROL FOR MACHINE TOOLS
Filed July 29, 1954  2 Sheets-Sheet 2

INVENTOR.
PIETER W. SCHIPPER
BY
HIS ATTORNEY

United States Patent Office 2,705,427
Patented Apr. 5, 1955

2,705,427

FEED AND RAPID CONTROL FOR MACHINE TOOLS

Pieter W. Schipper, Plymouth, Mich.

Application July 29, 1954, Serial No. 446,576

5 Claims. (Cl. 74—37)

This invention relates to feed and rapid traverse control mechanism particularly adapted for machine tools wherein the work or the cutting tool moves toward and away from the other such as in automatic lathes, boring machines, and the like.

In such machines it is particularly desirable to advance the work toward the tool, or the tool toward the work, in rapid traverse movement, slower feed movement and vice versa to effect the most efficient boring and cutting action of the tool in the work, and to reverse the action of the movable part.

It is therefore an object of the present invention to provide a novel feed mechanism which produces the desired rapid traverse, feed movement, and reverse by a constantly driven motor at a constant speed and without reversal of the motor.

Another object of the invention is to provide an endless belt, cable, chain or the like, driven in one direction of travel only by independently driving means having a differential drive and which are driven by the single driving motor. The endless belt drives idler wheels carried by the movable part, in one direction of rotation, and idler wheels, carried by the base or stationary part, in an opposite direction of rotation and a differential drive of the independently driving means causes the wheels on the movable part to move relative to the wheels on the stationary part.

A further object of the invention is to provide a take up device associated with the belt which keeps the belt taut at all times.

Other objects and advantages of the invention will more fully appear from the following description of one embodiment of the invention taken in connection with the accompanying in which:

Fig. 1 is a side elevational view of a machine, such as a boring machine, showing a sliding unit mounted on a stationary base, with switches and dogs for controlling the differential drive which moves the sliding unit;

Fig. 2 is a top plan view of the stationary unit, taken on line 2—2 of Fig. 1, with a portion of the sliding unit thereon and broken away;

Fig. 6 is a diagrammatic view illustrating a modified arrangement of the idler wheels, endless belt, and driving wheels.

Figure 3:
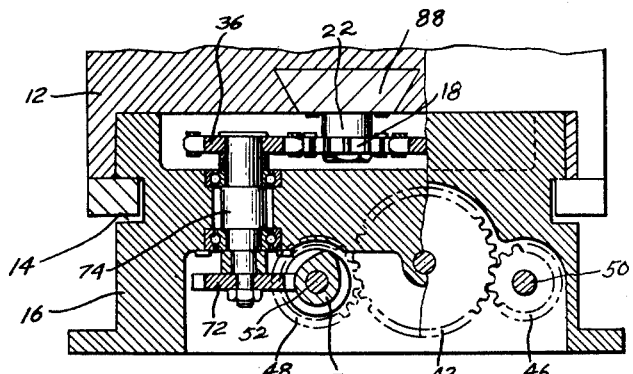
Fig. 3 is a transverse sectional view taken on line 3—3 of Fig. 2.

Referring to the drawings, there is illustrated a machine tool in the form of a boring machine having a tool rotating unit 10 mounted on a sliding table 12, guided in ways 14 in a stationary base 16. The invention has been illustrated as adapted to a boring machine, but it is equally applicable to lathes, drilling machines, tapping and reaming machines and the like wherein the tool and the work support are relatively movable. The invention has been described specifically with reference to an endless chain as forming the belt in driving engagement with sprockets for the purpose of illustration only and it is to be understood that a cable or other driving means may be employed for the belt and that pulleys or sprockets may be employed for the wheels.

Idler sprocket wheels 18 and 20 are rotatably mounted on pins 22 and 24 which are fixed to the sliding table 12. Other sprocket wheels 26 and 28 are rotatably mounted on pins 30 and 32 which are fixed to the stationary base 16. These sprocket wheels 26 and 28 are located at one end of the machine and driving sprocket wheels 34 and 36 are located at the opposite end of the machine, the sprocket wheels 18 and 20 being located intermediate the sprocket wheels 26, 28 and 34, 36.

The location of the sprocket wheels may be varied as illustrated diagrammatically in Fig. 6. This view also illustrates an arrangement of the belt and wheels in a plane as opposed to the horizontal plane as shown in Fig. 2. The two driving wheels 34' and 36' are located at one end of the machine and are driven by a motor. The desired speed differential is obtained by the difference in size of the wheels and gearing. The idler wheels 18' and 20' are located on the movable member and the idler wheels 26' and 28' are located on the stationary part.

An endless chain 38, shown as a chain, is in driving engagement with the sprocket wheels 18, 20, 26, 28, 34 and 36. In Fig. 2 the chain extends from driving sprocket 36 partially around idler sprocket 28, to and partially around idler sprocket 20, then to and partially around idler sprocket 26, then to and partially around driving sprocket 34, thence to and partially around idler sprocket 18, and back to and partially around driving sprocket 36. Thus, idler sprockets 18 and 20 are driven in a counterclockwise direction and idler sprockets 26 and 28 in a clockwise direction. The driving sprockets 34 and 36 are turning in a clockwise direction, but the chain 38 travels in one direction only.

A motor 40, driven at a constant speed, drives two axially spaced gears 42 and 44. These gears mesh with and drive gears 46 and 48 respectively which are mounted rotatably on driving shafts 50 and 52 journaled in the base 16. There is a differential in the gear ratio of the gears 46 and 48 which may be obtained by making one gear with its pitch diameter smaller than the other, as, for example, the gear 46 is shown having a smaller pitch diameter than the gear 48.

Figure 4:
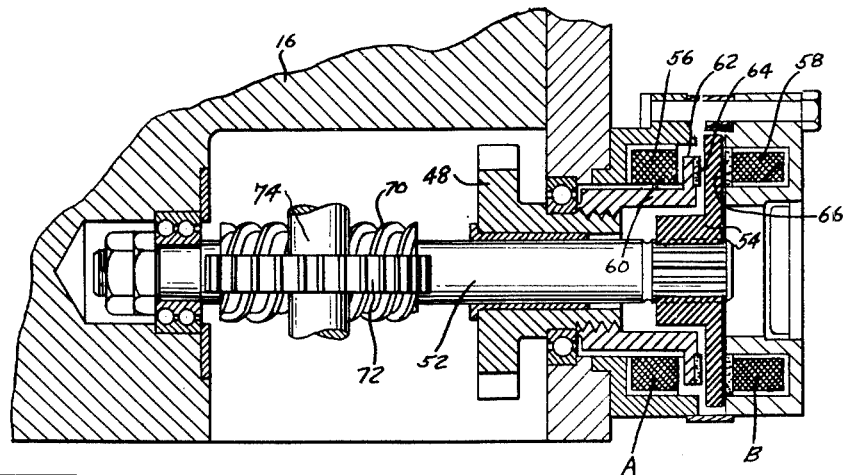
Fig. 4 is an enlarged fragmentary sectional view taken on line 4—4 of Fig. 2, showing one of the driving means and the magnetic clutch mechanism.
Figure 5:
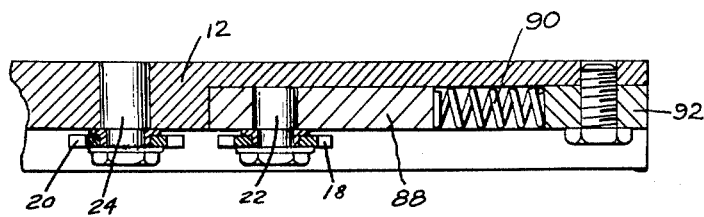
Fig. 5 is a fragmentary sectional view of the take up device for one of the idler wheels.

Referring to Fig. 4, wherein one of the driving shafts 52 is shown carrying the relative rotatable gear 48, there is shown a clutch plate 54 slidably mounted on the shaft 52. This clutch plate 54 is a part of a magnetic clutch wherein axially spaced electromagnets 56 and 58 are disposed at the opposite sides of the clutch plate 54. A flanged sleeve 60 is carried by the gear 48 and the flange 62 of the sleeve 60 rotates between the magnet 56 and the clutch plate 54. A brake lining 64 is provided on the face of the flange 62 adjacent the clutch plate 54 and a brake lining 66 is provided on the face of the magnet 58 adjacent the clutch plate 54. The clutch plate, being splined on the shaft 52, is free for axial shifting into frictional engagement with the brake lining 64 for receiving rotation movement imparted to it by the gear 48 when the magnet 56 is energized. When the magnet 58 is energized and the magnet 56 de-energized the clutch plate 54 slides into frictional engagement with the brake lining 66 on the face of the stationary magnet 58. Thus, the shaft 52 is rotated by the gear 48 when the clutch plate 54 is shifted to the left by the magnet 56 and is held stationary when shifted to the right by the magnet 58.

The shaft 52 carries a worm gear 70 in driving engagement with a worm wheel 72 which is mounted on a shaft 74 driving the sprocket 36. The sprocket 34 is driven by the shaft 50 through a similar arrangement of gear, clutch plate and magnets, as shown in Fig. 4, but there is a differential in speed of travel, due to the difference in pitch diameter between the gears 46 and 48.

Microswitches 76, 78 and 80 on the base member 16 are controlled by trip dogs 82, 84 and 86 on the sliding member 12. The switches and dogs may be positioned at locations to give the desired speed of travel, either rapid traverse, feed, or reverse. The switches 76, 78 and 80 are for controlling the two sets of double magnets, designated A, B, and C, D.

The slide 12 of the machine, as shown in Fig. 1 is in its approximately central position of travel, but when it is to start its cycle of operation, it is at the right hand side of the machine with the dog 86 closing the switch 80. The closing of the switch 80 causes the magnet C to be energized, drawing the clutch plate 54, on the shaft 50, to be drawn to the left in driving engagement with the flanged sleeve 60, driven by gears 46, 44 and motor 40. This drives the sprocket wheel 34 in a clockwise direction and the chain movement in a direction by the top arrow in Fig. 2. The sprocket 36 is held stationary, due to the magnet B being energized by the switch 80. The pin 30 being fixed to the base 16, and the sprocket 26 being free for rotation, the movement of the upper part of the chain causes the pins 22 and 24 to be drawn to the left in rapid traverse. When the slide 12 is moved to the left and the dog 84 strikes the switch 78, the switch closes energizing the magnet A and de-energizing the magnet B. The magnet A draws the clutch plate 54, on the shaft 52, to the left in driving engagement with the flanged sleeve 60, driven by gears 48, 42, and motor 40, driving sprocket 36. There being a differential in gear ratio between the gears 46 and 48, the sprocket 36 is driven at a slower rate of speed than the sprocket 34. This gives the desired feed speed because the sprocket 36 is driving the chain to compensate for a portion of the chain drive caused by the sprocket 34. The difference in speed rotation causes a difference in speed of travel of the chain between the sprockets 26 and 34 and between sprockets 28 and 36. This causes the sprockets 18 and 20 to move more slowly in their approach to the sprockets 26 and 28.

After completion of the feed stroke and the slide has moved to a position where the dog 82 throws in the switch 76, the slide 12 is retracted to its starting position. The switch 76 de-energizes magnet C and energizes magnet D. This causes sprocket 34 to remain stationary while sprocket 36 is driven in a clockwise direction. Since the sprocket 34 is stationary and the sprocket 36 is turning, that portion of the chain between sprockets 34 and 26 is stationary and the moving portion of the chain between sprockets 28 and 36 causes the pins 22 and 24, carrying the idler sprockets 18 and 20, to move to the right until the dog 86 throws out the switch 80 thereby de-energizing magnet A and energizing magnet B, at the same time energizing magnet C and de-energizing magnet D.

If desired, the machine may be provided with additional dogs and switches for controlling the magnets to produce a dwell at any point along the travel of the slide, magnets B and D are energized when a dwell is desired.

A means for compensating for the variations in the chain length and to keep the chain taut at all times, there is provided a sliding block 88 which carries one of the pins mounted on the slide 12. As shown herein the block 88 carries the pin 22 and a compression spring 90, between the block 88 and a removable support 92, urges the pin and idler sprocket 18 to the left.

From the foregoing it will be seen that there is provided a machine tool wherein a movable table is driven at different desired speeds from one end of the machine to the other and back again by an endless belt traveling in one direction only by a constantly driven motor in one direction only and without reversal of the motor.

It is to be understood that the invention is not limited to a chain as any endless belt may be used to accomplish the same result and pulleys may be substituted for sprockets. Various changes may be made such as to size, shape, and arrangement of parts without departing from the spirit of the invention and it is my intention to cover by the appended claims such changes as may be reasonably within the scope thereof.

I claim:
1. In a machine tool having a stationary base and a relatively movable table slidably mounted on said base, means for moving said table relative to said base comprising, a pair of idler wheels carried by fixed supports on said movable table, a pair of idler wheels carried by fixed supports on said base, a pair of driving wheels on one of said relatively movable members, an endless belt in driving engagement with said idler wheels and said driving wheels, and means for imparting a driving connection to either or both of said driving wheels.

2. In a machine tool having a stationary base and a relatively movable table slidably mounted on said base, means for moving said table relative to said base comprising, a pair of idler wheels at one end of one of said relatively movable members, a pair of driving wheels at the other end of the same relatively movable member, a pair of idler wheels on the other of said relatively movable members located between said first named idler wheels and said driving wheels, an endless belt in driving engagement with said idler wheels and said driving wheels, and means for imparting a driving connection to said driving wheels.

3. In a machine tool having a stationary base and a relatively movable table slidably mounted on said base, means for moving said table relative to said base comprising, a pair of idler wheels carried by fixed supports on said movable table, a pair of idler wheels carried by fixed supports on said base, a pair of driving wheels carried by said base, said driving wheels having a differential in speed of travel, an endless belt in driving engagement with said idler wheels and said driving wheels, and means for imparting a driving connection to said driving wheels.

4. In a machine tool having a stationary base and a relatively movable table slidably mounted on said base, means for moving said table relative to said base comprising, a pair of idler wheels carried by fixed supports on said movable table, a pair of idler wheels carried by fixed supports on said base, a pair of driving wheels on said base, an endless belt in driving engagement with said idler wheels and said driving wheels, a pair of driving gears, one for each of said driving wheels, a motor for driving said driving gears in the same direction of rotation, and a clutch between each of said driving gears and said driving wheels, there being a differential in speed of rotation between said driving wheels.

5. In a machine having a stationary base and a relatively movable table slidably mounted on said base, means for moving said table relative to said base comprising, a pair of idler wheels carried by one of said relatively movable members, a pair of idler wheels carried by the other of said relatively movable members, a pair of driving wheels carried by said last named member, said first named idler wheels having their axes arranged between the axes of said second named pair of idler wheels and the axes of said driving wheels, an endless belt forming a driving connection between said idler wheels and said driving wheels, means for causing rotation of one of said driving wheels, and means for causing rotation of both of said driving wheels at different speeds of rotation.

References Cited in the file of this patent
UNITED STATES PATENTS

| | | |
|---|---|---|
| 2,504,853 | Locke et al. | Apr. 18, 1950 |
| 2,648,238 | Paney | Aug. 11, 1953 |